W. S. McKEE, W. G. NICHOLS & A. H. EXTON.
MILL PINION.
APPLICATION FILED JAN. 4, 1916.
1,173,289.
Patented Feb. 29, 1916.
2 SHEETS—SHEET 2.
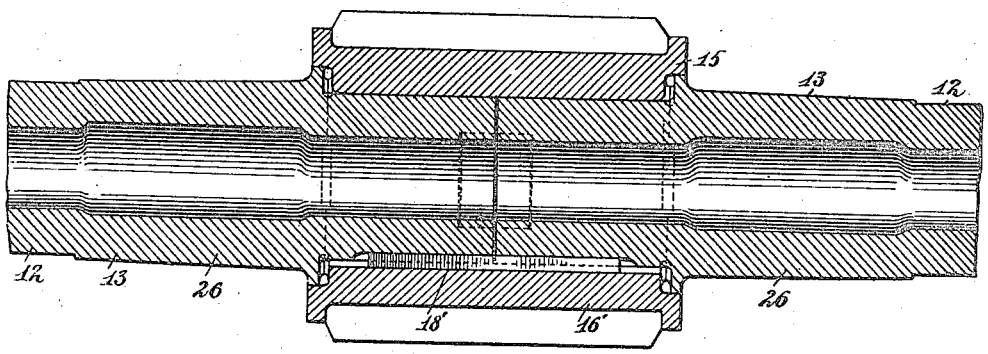
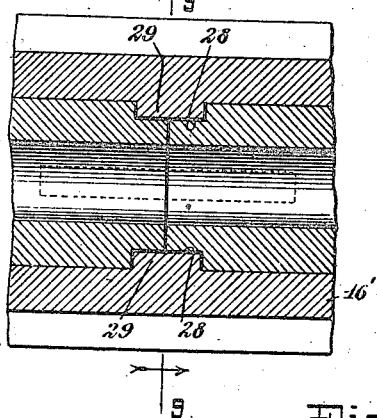
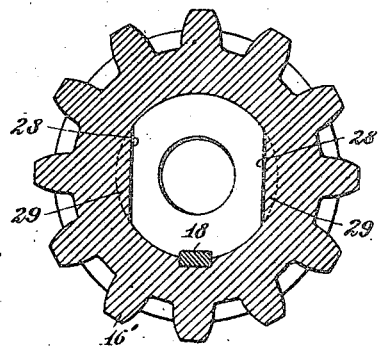
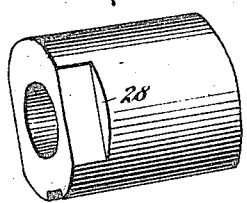
WITNESS
George E. Cook
Mabel E. Cutchley
INVENTORS
Walter S. McKee
Wesley G. Nichols
BY Alfred H. Exton
George Cook & Sons
ATTORNEYS

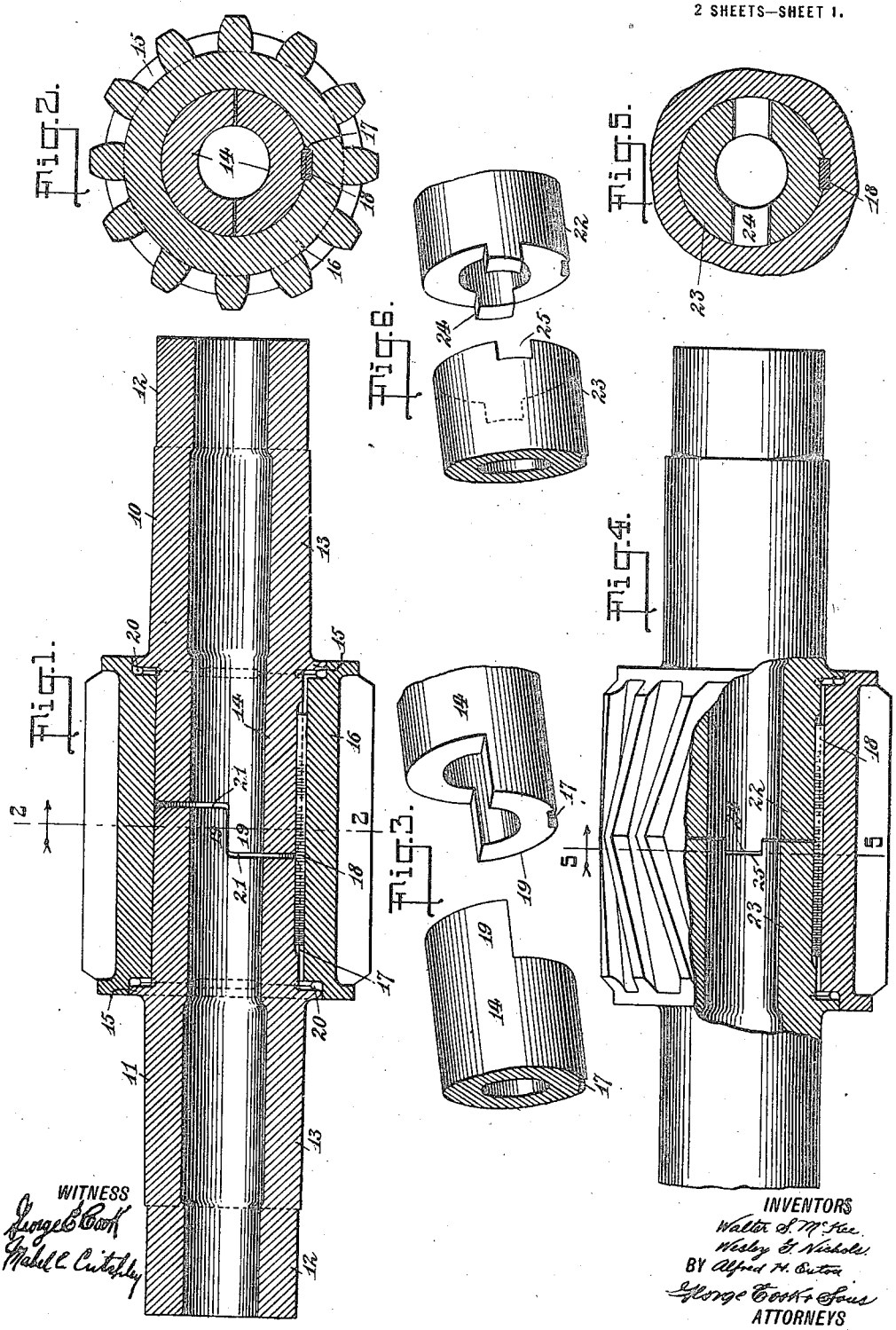

UNITED STATES PATENT OFFICE.

WALTER S. McKEE, OF CHICAGO, AND WESLEY G. NICHOLS AND ALFRED H. EXTON, OF CHICAGO HEIGHTS, ILLINOIS, ASSIGNORS TO AMERICAN MANGANESE STEEL COMPANY, OF AUGUSTA, MAINE, A CORPORATION OF MAINE.

MILL-PINION.

1,173,289.

Specification of Letters Patent.

Patented Feb. 29, 1916.

Application filed January 4, 1916. Serial No. 70,306.

*To all whom it may concern:*

Be it known that we, WALTER S. McKEE, a citizen of the United States, and a resident of Chicago, in the county of Cook and State of Illinois, and WESLEY G. NICHOLS and ALFRED H. EXTON, citizens of the United States, and residents of Chicago Heights, county of Cook, and State of Illinois, have made and invented certain new and useful Improvements in Mill-Pinions, of which the following is a specification.

This invention relates to mill rolls and pinions, and particularly to that type having the shaft formed in two parts, this type having recently come into prominence, due to the fact that the remote and power transmitting ends of the shaft may each occupy a position within the drag of the mold during casting, also because of the economy which may be obtained by substituting a new half-shaft for a broken one, should a portion of the pinion fail in service. With the shaft formed in two parts, there is danger of the half-shafts slipping within the toothed shell, particularly so when the pinion or roll is driven from one end, owing to the enormous power which must be transmitted from the half-shaft to the toothed shell.

An object of our invention, therefore, is to provide a construction wherein the full effect and benefit of the entire surfaces in contact, between the two half-shafts and the shell, will be obtained. This is obtained by providing for the direct transmission of power between the adjoining ends of the half-shafts, and from both half-shafts to the toothed shell, the transmission of power from the one half-shaft to the shell taking place in a manner exactly similar to the transmission of power from the two half shafts to the shell when the mill pinion or roll is driven from both ends of the half-shafts. The attainment of these objects relieves the key of high and excessive strains, and eliminates all likelihood of failure thereof.

A further object is to obtain the above-mentioned ends in a simple, practical and expeditious manner, and with these and other objects in view, our invention resides in the combination and arrangement of parts and in the details of construction herein described and shown, it being understood that changes in the precise embodiment of the invention can be made within the scope of what is claimed, without departing from the spirit thereof.

In the drawings, the preferred embodiment of our invention is disclosed, wherein:

Figure 1 is a view in longitudinal section of a mill pinion or roll embodying the characteristic features of our invention; Fig. 2 is a view in cross-section thereof, taken on the line 2—2 of Fig. 1; Fig. 3 is a fragmental view in perspective of the adjoining ends of the half-shafts showing the interlocking arrangement thereof, providing for the direct transmission of power therebetween; Fig. 4 is a view in side elevation and partially in section of a mill pinion or roll having a slightly modified form of securement and interlocking arrangement between the confronting and adjoining ends of the half-shafts; Fig. 5 is a view in section taken on the line 5—5 of Fig. 4; Fig. 6 is a fragmental view in perspective of the interlocking ends of this type of half-shafts; Fig. 7 is a view in longitudinal section of a somewhat further modified form of mill pinion or roll embodying, however, the characteristic features and essential ideas of our invention; Fig. 8 is a fragmental view in section similar to Fig. 7, the pinion or rail being rotated through 90°; Fig. 9 is a view in section taken on the line 9—9 of Fig. 8; and Fig. 10 is a fragmental view in perspective of one of the confronting ends of the half-shafts.

Referring specifically to the several views, the mill pinion disclosed in Figs. 1 to 3 inclusive, is formed with the two half-shafts 10—11, each of which includes the wabbler or power-transmitting ends 12, intermediate journal portions 13 and the flanged shell-receiving portions 14; these half-shafts are ordinarily formed of cast manganese steel and are hollow throughout.

The half-shafts are provided with the flanges 15, defining confronting shoulders, between, and to which, is secured the toothed shell 16. The term "toothed shell" is used in a broad sense, to indicate the outstanding gear teeth of a mill pinion or the continuous and circumferential teeth of a mill roll. The shell 16 and adjoining ends of the half-shafts are provided with the slots 17, in which is secured the key 18. The shell 16 is shrunk upon the adjoining ends of the half-shafts, thereby relieving the key 18 of considerable strains and stresses.

In those instances where the mill pinion is driven from one end, the enormous forces brought to bear upon the toothed shell 16 oftentimes cause the half-shaft to break loose within the shell. In order to render feasible the driving of the mill pinion from one end, without likelihood of the pinion failing in service, we have provided the confronting ends 14 of the half-shafts with the forwardly projecting segments 19, the formation of which defines interlocking fingers, substantially semi-cylindrical in form, as illustrated in Fig. 3. The toothed shell 16 is provided with the usual end recesses 20, which are adapted to receive the flanges 15 of the half-shafts therein, the spacing of the flanges and the depth of said recesses being such that the ends of the half-shafts are held a slight distance apart, defining the clearance space 21 therebetween.

A somewhat modified form of construction is illustrated in Figs. 4, 5 and 6; in this instance the adjoining and confronting ends 22—23 of the half-shafts being provided with the registering projections and recesses 24—25 respectively. This construction provides for the direct transmission of power from the one half-shaft to the other, so that if only one of the half-shafts be driven, power will be transmitted from both half-shafts to the toothed shell in a manner precisely similar to the transmission of power in the construction above described.

The mill pinion or roll illustrated in Figs. 7 to 10 inclusive is also formed for the transmission of power between the half-shafts and from the two half-shafts to the toothed shell, the latter action being dependent upon the friction between the surfaces of the shell and half-shafts caused by the shrinking of the former upon the latter. In this type of mill pinion, the half-shafts 26 are provided with the usual journal portions 13, power-transmitting ends 12 and flanges 15. The toothed shell 16' is shrunk upon the adjoining ends of the half-shafts and is secured thereto by the key 18'. The adjoining ends of the half-shafts are provided with the registering notches or depressions 28, which are adapted to receive therein the inwardly projecting lugs 29 formed integral with the toothed shell 16'. These lugs 29 of the shell being formed of manganese steeel, are not subject to failure under strains which would result in the destruction of the key 18. This construction provides for the transmission of power from one of the half-shafts to the other, and from both half-shafts to the toothed shell. With the mill pinions or rolls as herein described, should any portion thereof become broken, the broken element may be removed and a new one substituted therefor.

What we claim is:—

1. An article of the class described comprising alined half-shafts, a toothed shell carried thereby, and means at the adjoining ends of said half-shafts providing for the transmission of power therebetween.

2. An article of the class described comprising two alined half-shafts, a toothed shell secured to and spanning the juncture between said half-shafts, and interlocking means at the ends of said half-shafts providing for the transmission of power therebetween.

3. An article of the class described comprising alined half-shafts, a toothed shell carried thereby, said half-shafts formed for the direct transmission of power therebetween.

4. A mill pinion or roll comprising hollow alined half-shafts, a toothed shell carried thereby, said half-shafts provided at their confronting ends with interlocking means providing for the transmission of power therebetween.

5. An article of the class described comprising two hollow alined half-shafts, a toothed shell carried thereby, the confronting ends of said half-shafts provided with interengaging members providing for the direct transmission of power therebetween.

Signed at Chicago, in the county of Cook and State of Illinois, this 27th day of December, 1915.

WALTER S. McKEE.

Witnesses:
  EUGENE C. BAUER,
  NELLIE C. BASON.

Signed at Chicago Heights, county of Cook and State of Illinois, this 27 day of December, 1915.

WESLEY G. NICHOLS.

Witnesses:
  M. I. LA ZELLE,
  CHARLES FAHTSHAR.

Signed at Chicago Heights, county of Cook and State of Illinois, this 27 day of December, 1915.

ALFRED H. EXTON.

Witnesses:
  E. O. EDMAN,
  C. C. UHRHAMER.